(12) United States Patent
Matis et al.

(10) Patent No.: US 6,416,610 B1
(45) Date of Patent: Jul. 9, 2002

(54) METHOD FOR MAKING A SOLE SYSTEM FOR FOOTWEAR

(75) Inventors: Clark A. Matis, Charlotte, VT (US); Lucio Bandini, Montebelluna (IT)

(73) Assignee: Wolverine World Wide, Inc., Rockford, MI (US)

( * ) Notice: Subject to any disclaimer, the term of this patent is extended or adjusted under 35 U.S.C. 154(b) by 0 days.

(21) Appl. No.: 09/560,358

(22) Filed: Apr. 28, 2000

(51) Int. Cl.[7] ............................................. B29C 45/14

(52) U.S. Cl. .................. 156/245; 264/238; 264/244; 264/255; 264/273; 264/274; 264/275; 264/279.1

(58) Field of Search ................................. 264/244, 275, 264/279.1, 255, 274, 273, 254, 238; 156/245

(56) References Cited

U.S. PATENT DOCUMENTS

| | | | |
|---|---|---|---|
| 4,608,768 A | * | 9/1986 | Cavanagh ..................... 36/28 |
| 4,654,983 A | * | 4/1987 | Graham et al. ............. 36/30 R |
| 4,656,760 A | * | 4/1987 | Tonkel et al. .................. 36/28 |
| 6,000,923 A | * | 12/1999 | Lo ............................. 425/112 |
| 6,132,663 A | * | 10/2000 | Johnson et al. ............. 264/250 |

FOREIGN PATENT DOCUMENTS

DE  4206534 A1 * 9/1993

* cited by examiner

Primary Examiner—Jan H. Silbaugh
Assistant Examiner—Edmund H. Lee
(74) Attorney, Agent, or Firm—Warner Norcross & Judd LLP (57) ABSTRACT

A footwear construction and method for manufacturing the same. The sole include a rigid flexplate suspended within the midsole. The flexplate extends along substantially the entire length and width of the sole. The sole also preferably includes a rear stabilizer molded in place about the heel region of the midsole. Further, the footwear may include a dual-density collar disposed about the ankle region of the upper. The collar includes a relatively soft inner layer that permits the collar to be stitched to the upper and a relatively rigid outer layer that provides the desired level of stability. The sole is preferably manufactured using the general steps of (a) providing a mold with a plurality of flexplate locating pins, (b) positioning a flexplate within the mold, (c) injecting the midsole material into the mold about the flexplate, and (d) attaching an outsole to the midsole. The rear stabilizer is preferably molded prior to and retained within the mold during the midsole molding step. The collar is preferably molded in sequential shots, with the inner and outer materials being molded from the same family of materials to enhance bonding. The molded collar is stitched to the upper and cement to the sole.

11 Claims, 12 Drawing Sheets

METHOD FOR MAKING A SOLE SYSTEM FOR FOOTWEAR

BACKGROUND OF THE INVENTION

The present invention relates to footwear and more particularly to a footwear construction and a method for making the same.

In the footwear industry, there is an ongoing effort to produce footwear that provides stability and support while maintaining a high level of comfort. These needs are particularly acute in the design of high performance footwear, such as hiking, mountaineering, multisport and rugged outdoor walking footwear, where one of the primary goals is to reduce fatigue. To minimize the effects of travel over jagged, rugged or uneven surfaces it is important to provide high performance footwear with both torsional stability (e.g. resistance to twisting forces) and longitudinal stability (e.g. resistance to linear forces).

Conventionally, the interests of stability and comfort have been competing interests. Efforts to improve stability and support typically result in a reduction in comfort. For example, a common technique for improving comfort is too increase the amount of cushioning material in the sole assembly, such as by manufacturing the midsole from a softer, more resilient material. While this increases comfort, it reduces the stability and comfort of the article of footwear. Likewise, a common technique for increasing stability and support is to provide a rigid insole or a rigid midsole. As both of these components lie close beneath the foot, a rigid insole or midsole typically provides very limited cushioning and therefore results in reduced comfort. Another technique for increasing stability is to sandwich a rigid arch support or heel support between the midsole and the insole. Again, these components lie just below the wearer's foot and provide little room for cushioning. As a result, there remains a long felt and unmet need for a footwear construction that provides the desired level of cushioning, stability and support.

SUMMARY OF THE INVENTION

The aforementioned problems are overcome by the present invention which provides an extended structural component, or flexplate, molded in situ within the midsole. The flexplate is preferably disposed centrally within the midsole where it is entrapped within the relatively soft material of the midsole. The flexplate is rigid and extends substantially along the entire length and width of the midsole to provide full support for the wearer's foot. In a preferred embodiment, the flexplate defines a plurality of openings that permit the midsole material to flow about and thoroughly entrap the flexplate. Further, in a preferred embodiment, the heel portion of the flexplate is cupped to, among other things, aid in centering the wearer's foot.

In another preferred embodiment, the present invention includes a rear stabilizer that provides even further enhanced stability in the heel region. The rear stabilizer is preferably molded in place about the heel portion of the midsole. The rear stabilizer is molded from a relatively rigid polymer, typically from the same family of polymers as the remainder of the midsole.

The sole of the present invention is preferably manufactured using the general steps of (a) providing a rigid flexplate, (b) providing a mold with flexplate locating pins, (c) suspending the flexplate within the mold between the locating pins, (d) molding the midsole about the flexplate, (e) molding the rear stabilizer about the midsole, (f) attaching an outsole to the midsole, and (g) attaching the upper to the midsole/outsole combination.

The present invention further includes a dual-density collar disposed about the ankle portion of the upper. The collar includes a first relatively soft polymer that permits the collar to be stitched directly to the upper and a second relatively stiff polymer that provides the collar with the desired level of rigidity. The two layers are molded together to form a single, integral unit. In the preferred embodiment, the collar is anchored to the sole and provides a mounting location for a lacing hook. As a result, the lacing pressure on the lacing hook is distributed over a large portion of the footwear, including the sole.

The collar of the present invention is preferably manufactured using the general steps of (a) providing a mold having distinct cover molds, (b) molding the first layer of the collar in a first shot of material having a first rigidity, (c) replacing the first cover mold with a second cover mold, and (d) molding the second layer of the collar in a second shot of material having a second rigidity, typically from the same family of polymers as the material of the first shot.

The present invention provides a unique footwear construction having a heretofore unachieved combination of comfort, stability and support. The flexplate provides torsional and linear stability over the entire foot. The rear stabilizer provides enhanced stability in the heel region where torsional forces can be particularly damaging. The cupped heel region of the flexplate helps to center the wearer's heel. The collar provides stability and support to the heel and ankle regions of the upper while simultaneously distributing lacing pressure over the upper and into the sole. Accordingly, the collar helps to anchor the wearer's foot to the sole to take full advantage of the stability and support provided by the flexplate.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
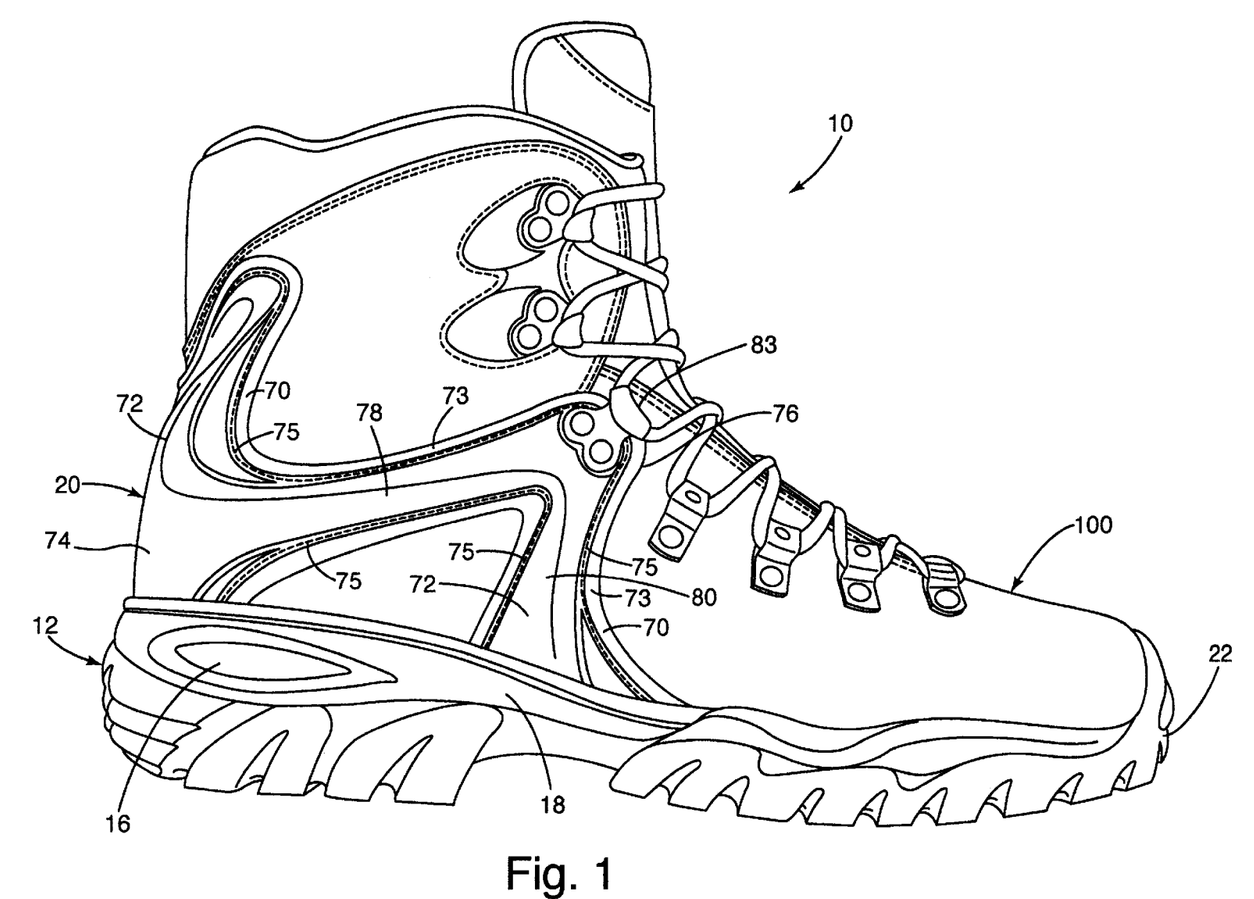
FIG. 1 is a side elevational view of an article of footwear incorporating the flexplate, rear stabilizer and collar of the present invention.

A hiking boot incorporating the sole and collar of the present invention is shown in FIG. 1 and generally designated 10. The hiking boot 10 generally includes an upper 100, a sole 12 and a collar 20. The sole 12 includes a rigid flexplate 14 embedded within a relatively resilient midsole part 16 (See FIG. 2). A rear stabilizer 18 extends around the sole 12 in the heel portion to add stability to the heel portion of the sole 12. The collar 20 extends around the upper 100 to provide improved heel retention and enhanced the lateral stiffness in the ankle region of the upper 100. The present invention is described in connection with a mid-height hiking boot 10. The present invention is, however, well suited for us in other types of footwear, including other outdoor footwear, walking footwear, athletic footwear, multisport footwear and work footwear.

Figure 2:
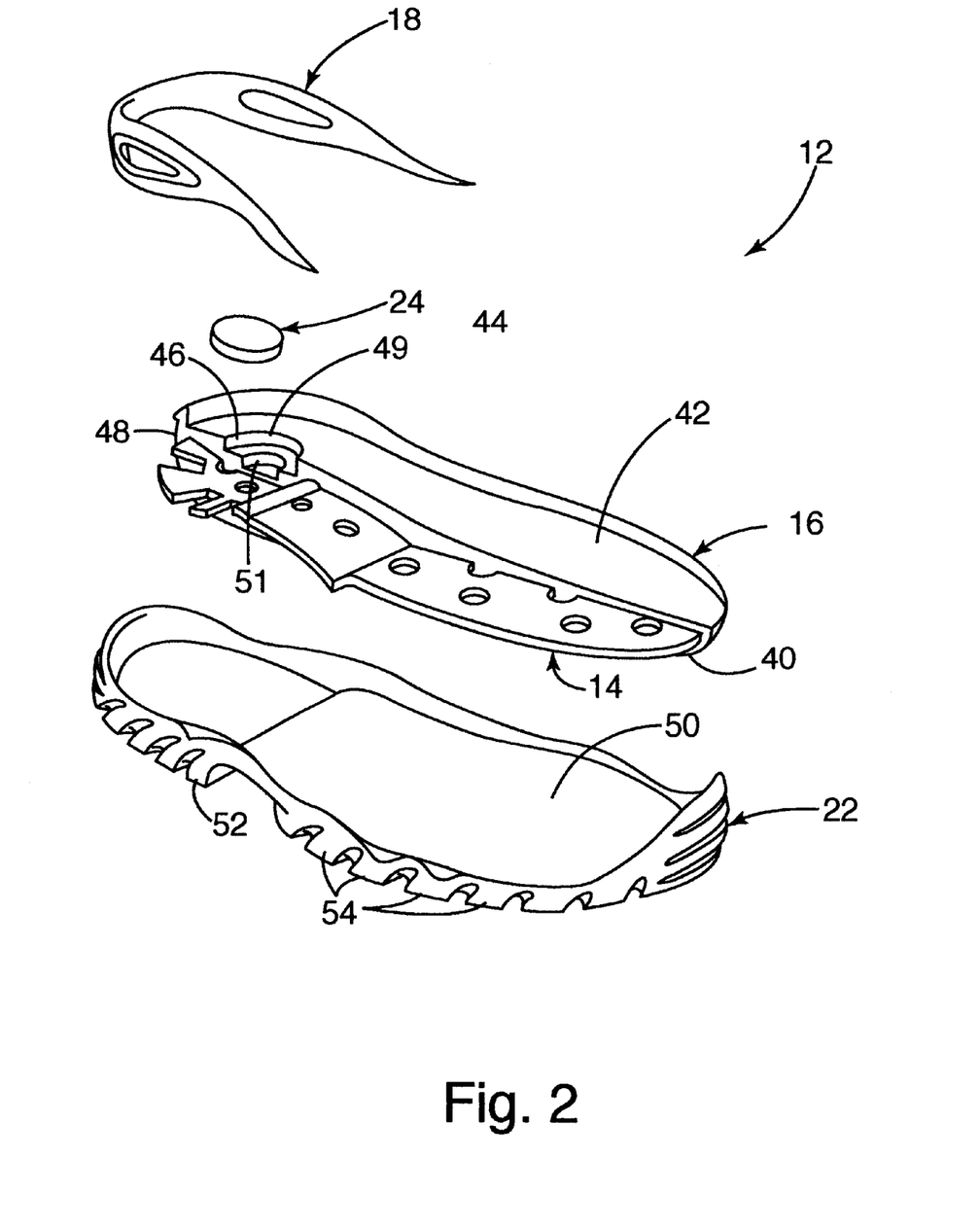
FIG. 2 is an exploded perspective view of a sole according to a preferred embodiment of the present invention with portions cut away to show the flexplate.

Referring now to FIG. 2, the sole 12 includes flexplate 14, midsole part 16, rear stabilizer 18, outsole 22 and cushioning insert 24. The flexplate 14, midsole part 16 and rear stabilizer 18 are manufactured as a single integrated assembly 26 (See FIG. 3). The outsole 22 is secured to the assembly 26 to provide a durable wear surface. The flexplate 14 includes a forefoot portion 32 that is generally planar and extends through the forefoot of the sole 12, an arch portion 34 that is shaped to curve up through the arch of the sole 12, and a heel portion 36 that is shaped to form a cup 38 in the heel of the sole 12. The cup 38 is shaped to accommodate the cushioning insert 24. The flexplate 14 is manufactured from a rigid material selected to provide the sole 12 with the desired rigidity. A suitable material is polymeric amide, such as nylon, with reinforcing fiberglass. The percentage of fiberglass will vary from application to application depending on the desired stiffness. For example, 15% fiberglass may be used in lighter applications while 20% may be used in heavier applications. The flexplate 14 defines a plurality of circular openings 28 as well as plurality of notches 30 about the periphery of the heel portion that permit the midsole material to flow around and entrap the flexplate 14 during manufacture, as described in more detail below. In the preferred embodiment, a conventional bonding fabric 64 is applied to the upper 60 and lower 62 surfaces of the flexplate 14 to improve the bond between the differing materials of the flexplate 14 and the midsole part 16. Fabrics of this type are readily available from a variety of suppliers, and their use in molding applications for improved bonding are well-known to those skilled in the art.

Figure 3:
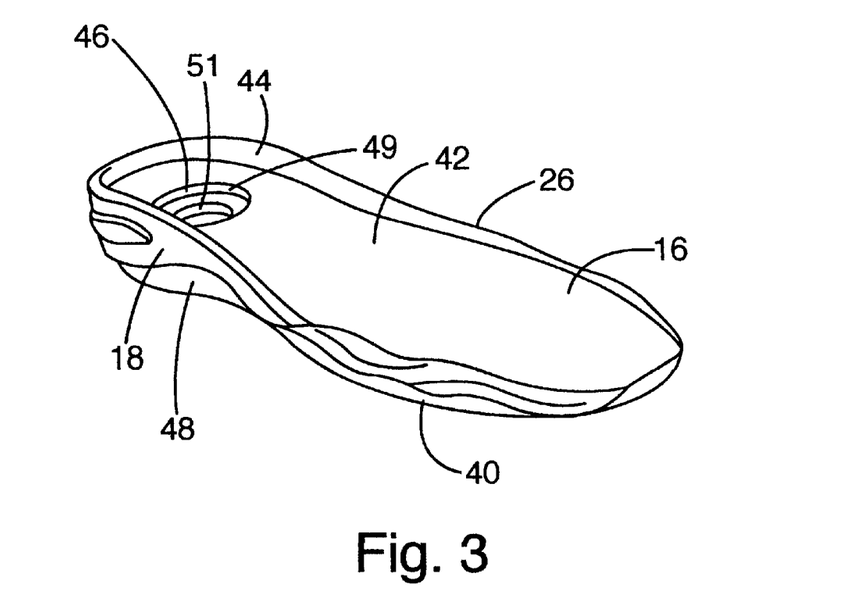
FIG. 3 is a perspective view of the midsole of the present invention.
Figure 4:
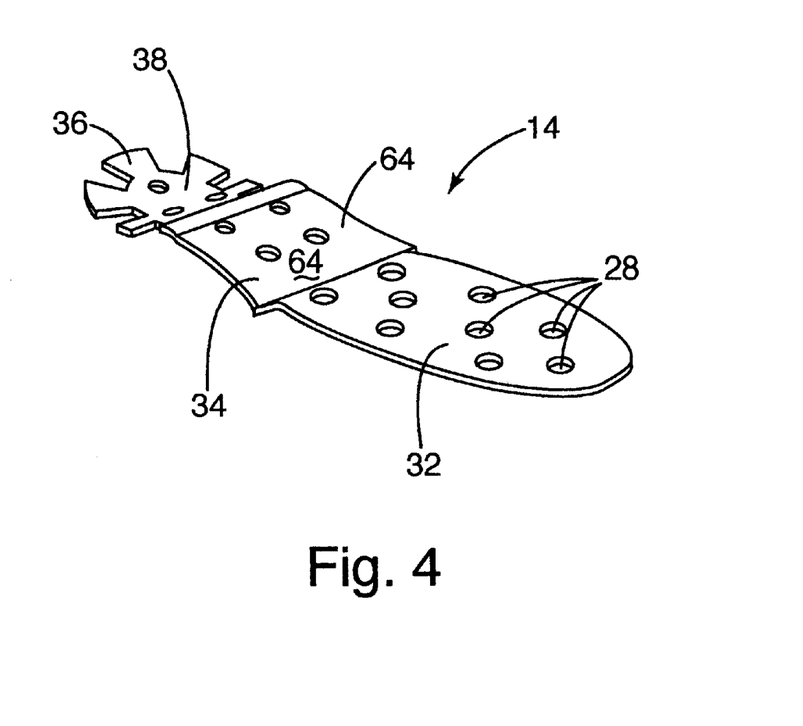
FIG. 4 is a perspective view of the flexplate.
Figure 5:
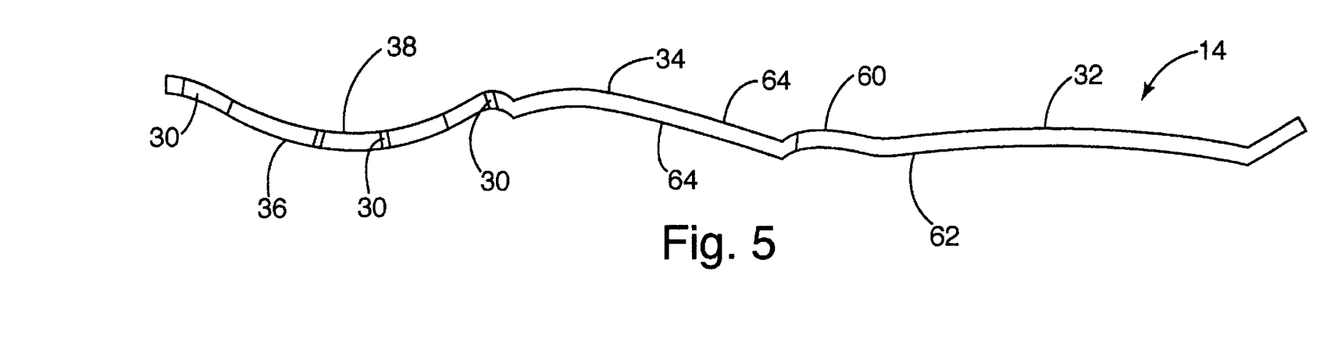
FIG. 5 is a side elevational view of the flexplate.
Figure 6:
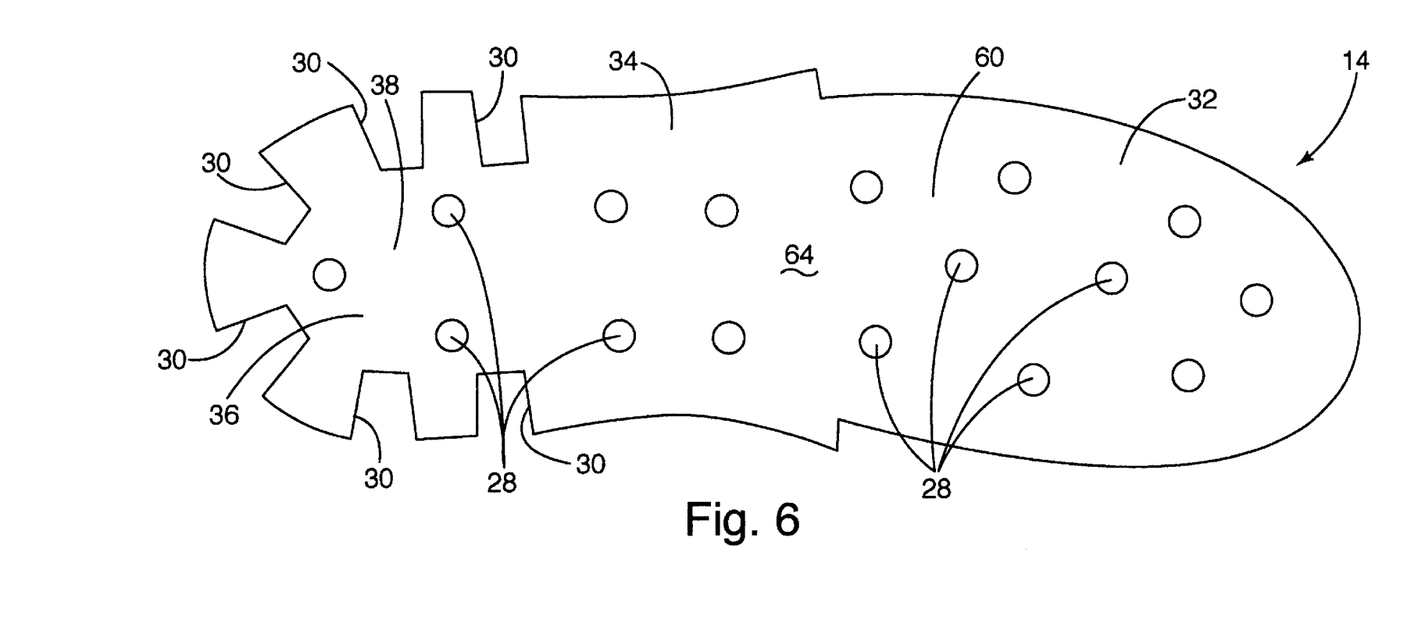
FIG. 6 is a top plan view of the flexplate.
Figure 7:
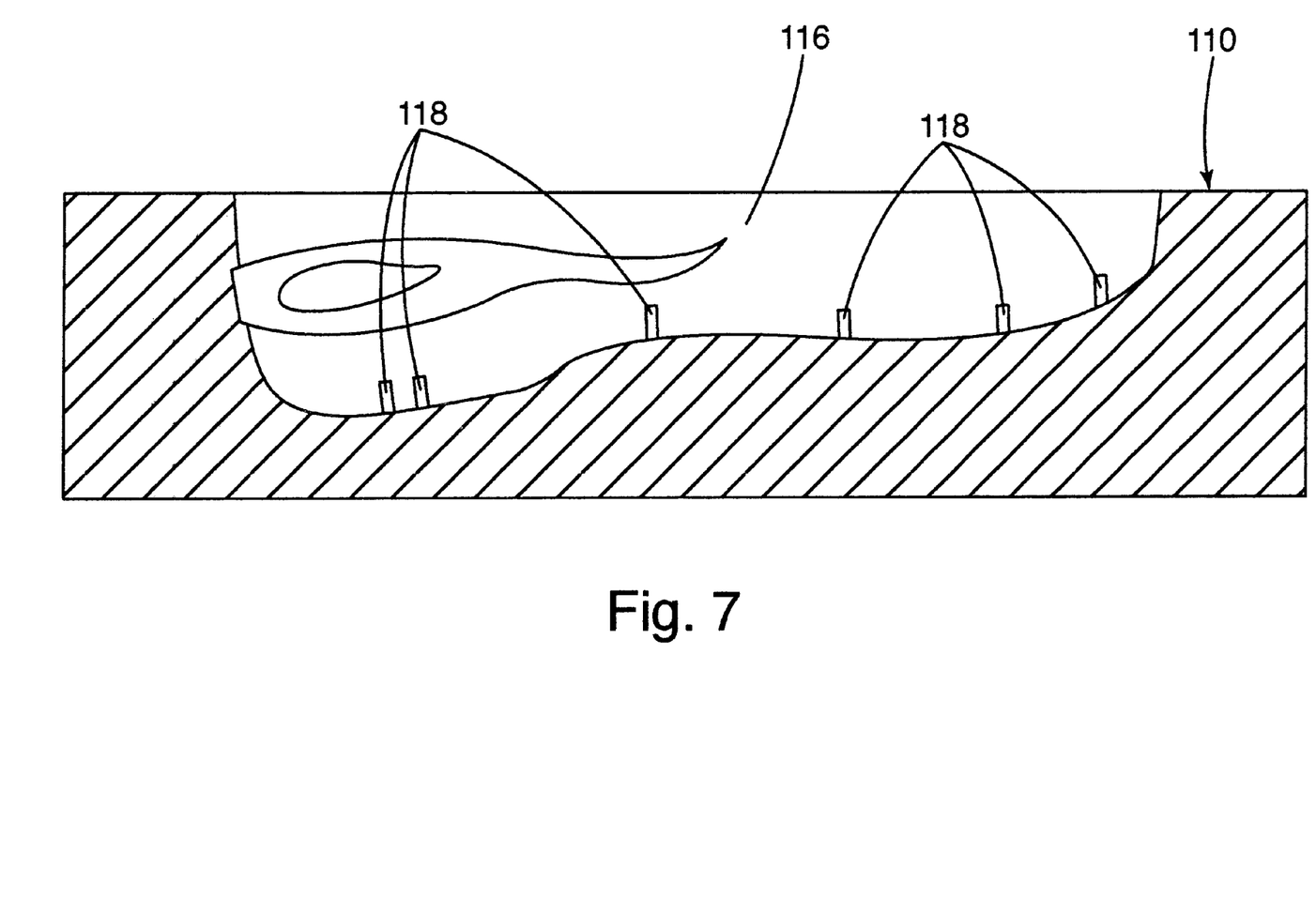
FIG. 7 is a sectional view of the midsole base mold.

The midsole part 16 is molded about the flexplate 14. The midsole part 16 preferably completely surrounds the flexplate 14 so that no portions of the flexplate 14 are exposed. The midsole part 16 includes a lower surface 40, an upper surface 42 and a peripheral surface 48. The lower surface 40 is shaped to match the shape of the upper surface of the outsole 22 so that the two components can be attached, as described in more detail below. The upper surface 42 of the midsole part 16 is shaped to form a footbed for receiving the wearer's foot. The upper surface 42 includes a peripheral wall 44 having a curved inner surface that is shaped to wrap slightly around the wearer's foot. The midsole part 16 defines an insert recess 46 for receiving the cushioning insert 24. The insert recess 46 includes two concentric, circular regions 49, 51 that extend into the midsole part 16 from the upper surface 42. The upper circular region 49 has a larger diameter than the lower circular region 51. The midsole part 16 is molded from a relatively resilient polymer to provide the sole 12 with the desired resiliency. A suitable material for the midsole part 16 is Hipren SL3, which is available from Goldenplast spa of Potenza Picena, Italy.

The rear stabilizer 18 wraps around the heel portion of the midsole part 16 to stiffen and stabilize the sole 12 and particularly the peripheral wall 44 of the midsole part 16. The rear stabilizer 18 preferably extends along the peripheral surface 48 of the midsole part 16 from a point near the instep portion, around the heel portion of the midsole part 16, and to a point on the exterior of the peripheral surface 48 approximately opposite of its starting point on the instep portion. In the preferred embodiment, the rear stabilizer 18 extends as close to the flexplate 14 as possible without risking exposure of the flexplate 14. This reduces the amount of relatively soft midsole part 16 disposed between the flexplate 14 and the rear stabilizer 18, thereby stiffening the rear stabilizer 18. The rear stabilizer 18 is preferably contained in the mold at the time the midsole part 16 is molded so that it becomes integrally attached to the midsole part 16. The rear stabilizer 18 is preferably manufactured from a relatively stiff polymer. A suitable material for the rear stabilizer 18 is Hipren H2T, which is available from Goldenplast spa of Potenza Picena, Italy.

The cushioning insert 24 is fitted within the upper circular region 49 of the cushioning insert recess 46 leaving the lower circular region 51 vacant. The cushioning insert 24 helps to provide the sole 12 with the desired resiliency and to aid in centering the wearer's heel within the boot 10. In the described embodiment, the cushioning insert 24 is manufactured from a resilient material, such as EVA or polyurethane, that is selected to provide the desired level of cushioning beneath the wearer's heel. The cushioning insert 24 is shaped to fit closely within and complement the shape of the upper region 49 of the insert recess 46. The illustrated insert 24 is merely exemplary, and may be replaced by an alternative insert having a different size, shape or composition. In some applications, the insert 24 may be eliminated altogether, in which case the insert recess 46 would also be eliminated.

The outsole 22 is generally conventional and is secured to the midsole part 16 to provide the sole 12 with a durable and non-slip wear surface. The design and configuration of the outsole 22 will vary from application to application as desired. In the preferred embodiment, the outsole 22 is a polymeric material selected from one of many well-known outsole materials having relatively high durometer. The outsole 22 includes an upper surface 50 that is secured to the lower surface 40 of the midsole part 16, preferably by cement or other adhesives. The outsole 22 also includes a lower surface 52 that is shaped to define the desired tread pattern. For example, the lower surface 52 may include a plurality of cleats 54 or other tread elements.

Referring now to FIGS. 1 and 13–16, the collar 20 is fixed to the upper 100 and the sole 12 to provide support in the ankle region. The collar 20 is manufactured from polymeric materials, and includes an inner layer 70 and an outer layer 72 that are molded together to form an integral, one-piece collar 20. The inner layer 70 is manufactured from a relatively soft polymeric material, such as thermoplastic polyurethane (TPU) LPR 8520 available from Goldenplast spa, which has a hardness of approximately 86 shore A. This material permits the collar 20 to be secured to the upper 100 using conventional stitching techniques and apparatus. The outer layer 72 is manufactured from a harder polymeric material, such as TPU LPR 5725 available from Goldenplast spa, which has a hardness of approximately 56 shore D. This layer 72 provides the collar 20 with the desired rigidity and stiffness. When the two layers are combined, the collar 20 provides significant stability while still being readily securable to the upper using conventional stitching techniques and apparatus. The inner layer 70 includes a marginal portion 73 that extends beyond the outer layer 72 in the integrated collar 20. The marginal portion 73 provides a stitching allowance through which the collar 20 can be stitched to the upper 100 such that the stitching 75 passes only through the soft and flexible inner layer 70.

Figure 13:
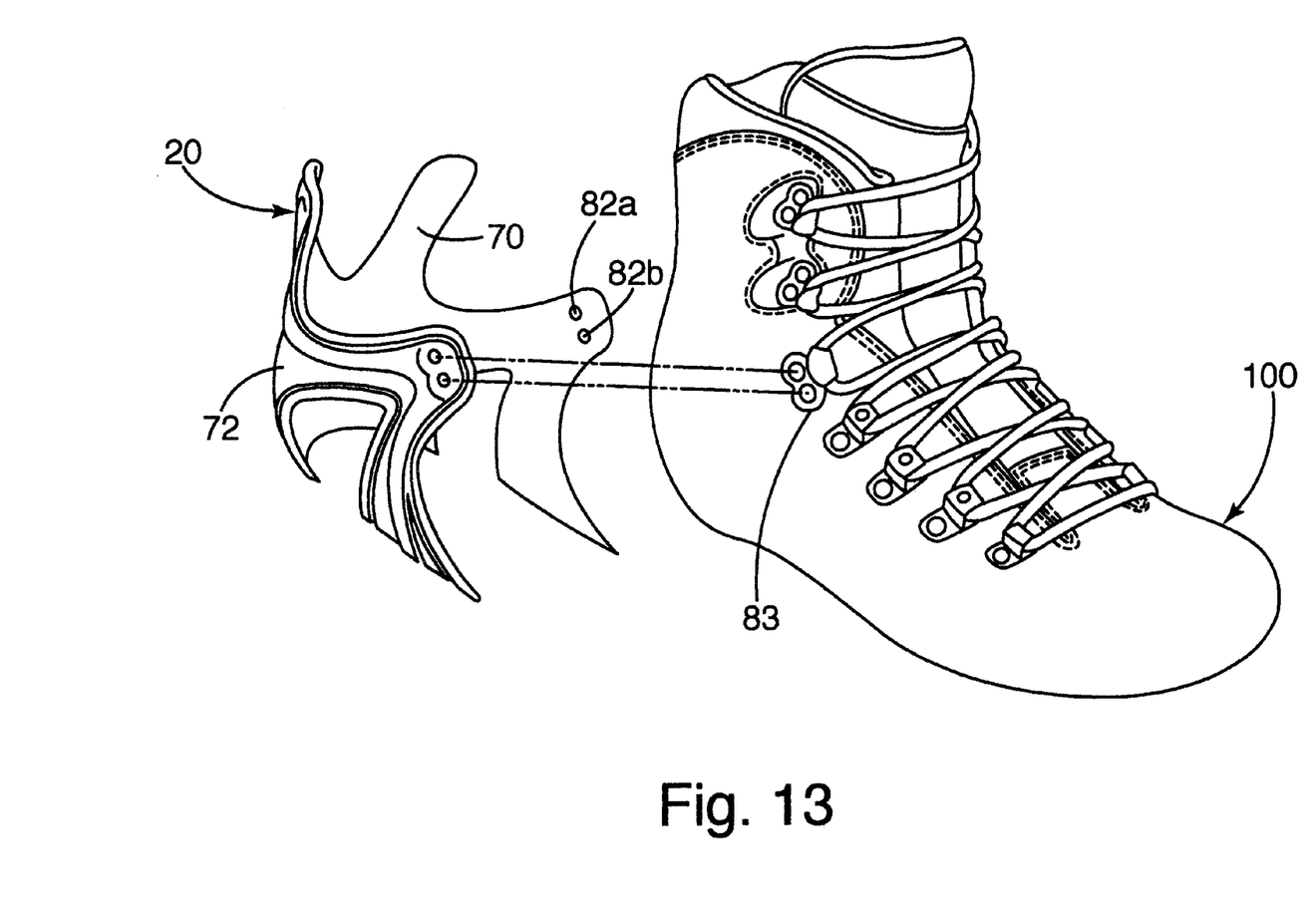
FIG. 13 is an exploded perspective view of the upper and collar.
Figure 14:
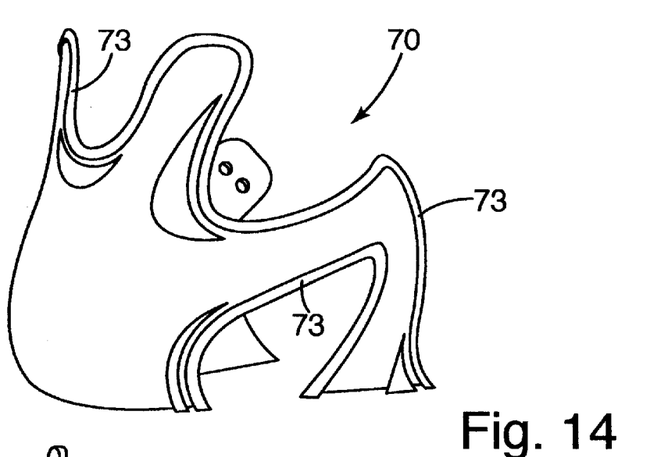
FIG. 14 is a perspective view of the inner layer of the collar.
Figure 15:
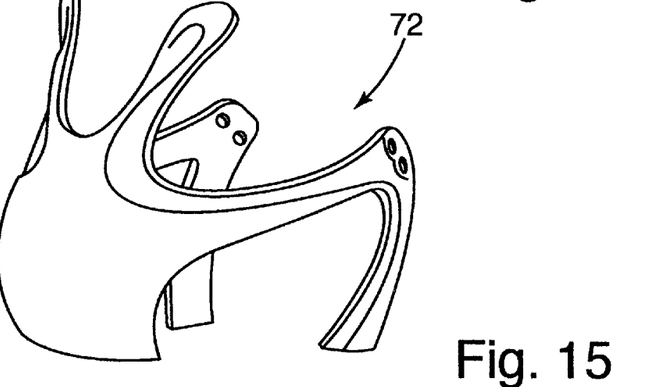
FIG. 15 is a perspective view of the outer layer of the collar.
Figure 16:
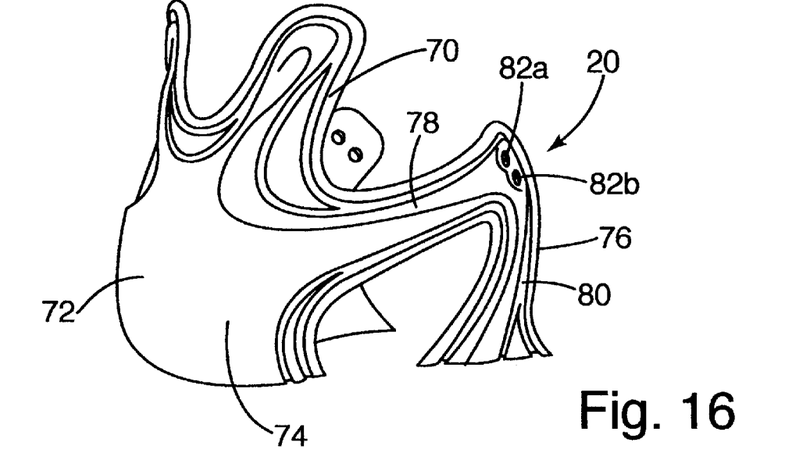
FIG. 16 is a perspective view of the collar.

The collar 20 includes a cup portion 74 that extends around the heel of the boot and upwardly along the rear of the ankle portion of the boot. The collar-20 further includes a lacing portion 76 having a somewhat horizontal span 78 that extends forwardly from the cup portion 74 and a somewhat vertical span 80 that extends downwardly to the sole 12. The lacing portion 76 defines a pair of holes 82a–b, which permit a lacing hook 83 to be secured to the collar 20 by rivets or other conventional fasteners. The collar 20 improves the function of the lacing system by distributing the lacing pressure over a large portion of the boot 10, including the sole 12 and heel region of the boot 10. With conventional systems, the pressure of the lacing system is centralized at the location at which the lacing hook is secured to the upper.

MANUFACTURE AND ASSEMBLY

Manufacture of the boot 10 will now be described with reference to FIGS. 7–17. The upper 100 is generally conventional and will not therefore be described in detail. Suffice it to say the that upper 100 is manufactured from conventional upper materials using conventional techniques and apparatus. In the preferred embodiment, the upper 100 is provided with an allowance permitting it to be secured to the sole 12 using conventional adhesives.

The sole 12 is manufactured by first molding the flexplate 14 from fiberglass reinforced nylon. As noted above, the proportionate amount of fiberglass will vary from application to application, but is preferably within the range of 10–30%. The flexplate 14 is manufactured using conventional injection molding techniques and apparatus. The fabric 64 is cut to the shape of the flexplate 14 and is placed in the base and cover molds of the flexplate mold (not shown) in a conventional manner. The flexplate mold is closed and the flexplate material is injected into the mold where it fills the mold cavity and comes into direct contact with the fabric 64. The material is then permitted to cure such that the fabric 64 is disposed on the upper and lower surfaces of the flexplate 14. Once the flexplate 14 is sufficient cured, it is removed from the flexplate mold (not shown) and is ready for incorporation into the midsole part 16.

Figure 8:
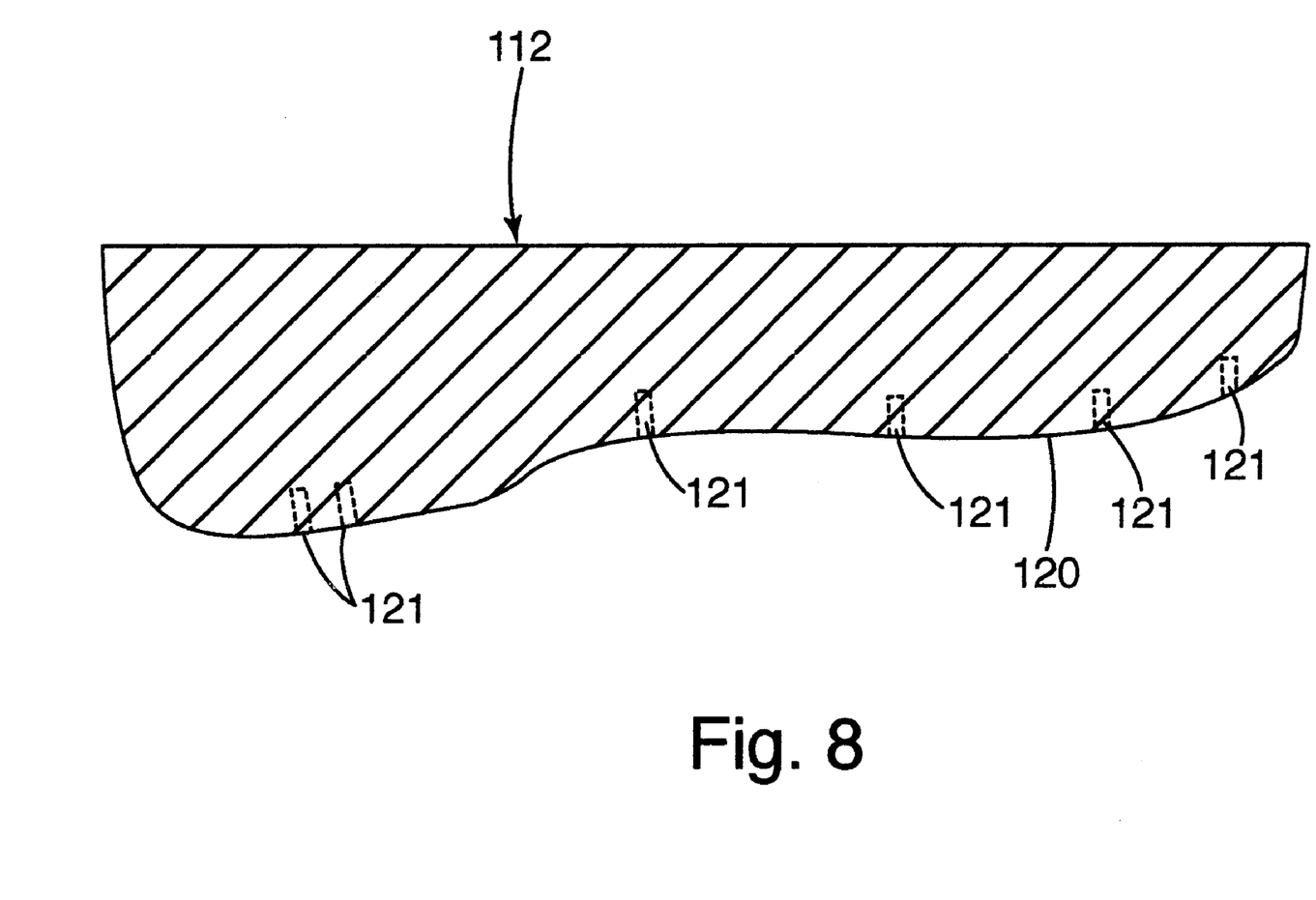
FIG. 8 is a sectional view of the first midsole cover mold.
Figure 9:
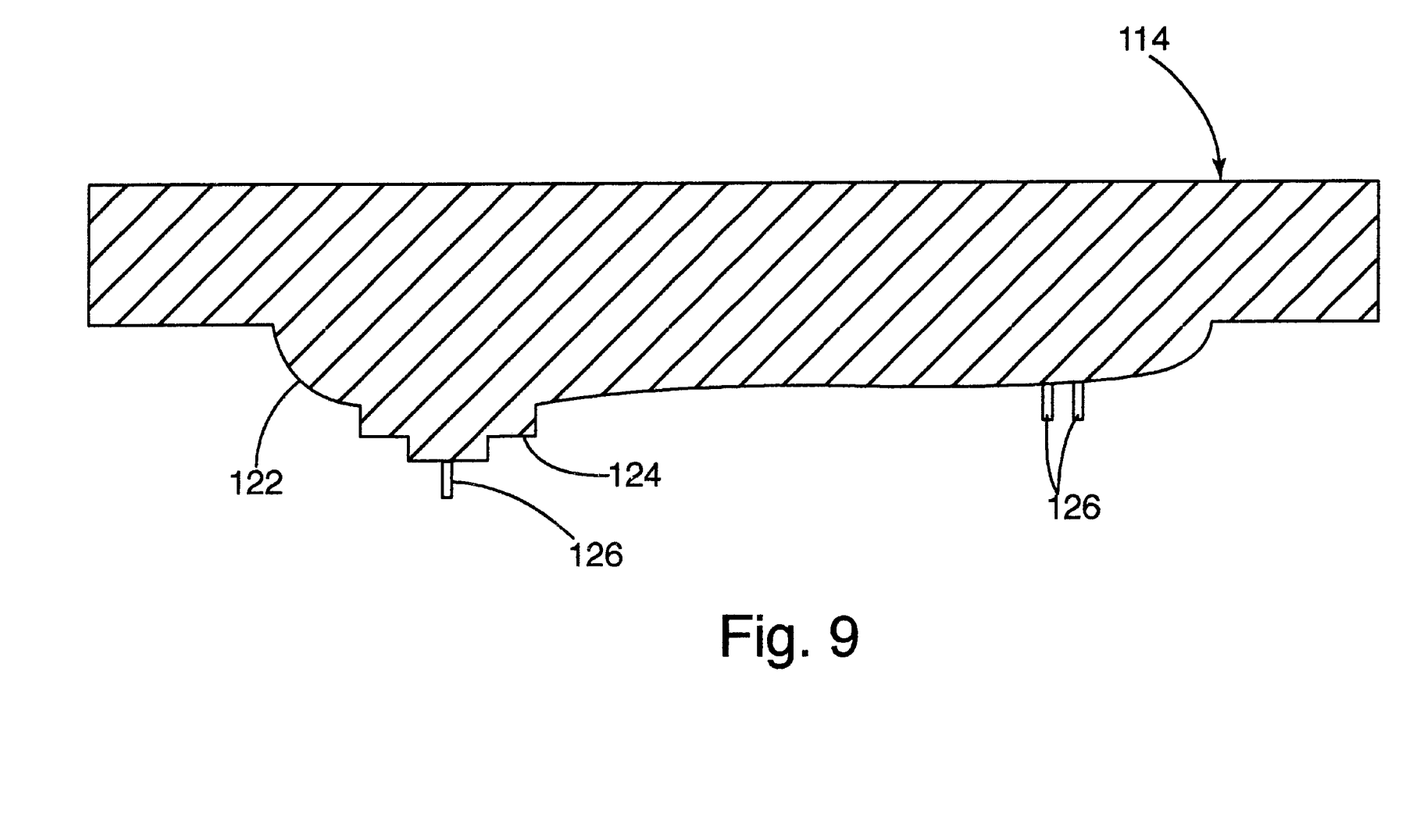
FIG. 9 is a sectional view of the second midsole cover mold.

The midsole part 16 is manufactured using a midsole mold having a base mold 110 (See FIG. 7) and a pair of interchangeable cover molds 112 (See FIG. 8) and 114 (See FIG. 9). The base mold 110 defines a cavity portion 116 that is shaped to define the majority of the midsole part 16 as well as the rear stabilizer 18. The base mold 110 includes a plurality of flexplate locating pins 118 that extend upwardly to retain the flexplate 14 in position within the mold cavity during the midsole part 16 injection step. The first cover mold 112 is used during molding of the rear stabilizer 18. Accordingly, it includes a male portion 120 that extends into and cooperates with cavity portion 116 to define a cavity in the shape of the rear stabilizer 18. The male portion 120 defines a series of openings 121 adapted to receive the flexplate locating pins 118 when the first cover mold 112 is closed onto the base mold 110. The remaining portion of the mold cavity is separated from the rear stabilizer 18. The appropriate material is then injected into the rear stabilizer cavity, where it is permitted to cure to define the rear stabilizer 18.

Once the rear stabilizer 18 is sufficiently cured, the first cover mold 112 is removed and the mold 110 is prepared for molding of the midsole part 16. The rear stabilizer 18 is left in place within the base mold 110 so that it will become integrally attached to the midsole part 16 during molding of the midsole part 16. In addition, the previously molded flexplate 14 is inserted into the cavity portion 116 of the base mold 110 atop the locating pins 118. The second cover mold 114 closes the base mold 110 and includes a male portion 122 that extends into and cooperates with the cavity portion 116 to define a cavity in the shape of the midsole part 16. The male portion 122 includes a protrusion 124 that defines the insert recess 46 as well as a plurality of flexplate locating pins 126 that extend down into the cavity portion 116 to locate the flexplate 14.

Once the second cover mold 114 is closed on the base mold 110, the material of the midsole part 16 is injected into the mold. The material fills the mold cavity surrounding and entrapping the flexplate 14 while also engaging and bonding to the rear stabilizer 18. Because the rear stabilizer 18 and midsole part 16 are molded from materials in the same family (e.g. Hipren) a good bond between the two components is achieved. The second cover mold 114 remains in place until the material is sufficiently cured. The second cover mold 114 is then opened and the midsole part 16 is removed.

The outsole 22 is preferably manufactured using conventional techniques and apparatus. In the illustrated embodiment, the outsole 22 is compression molded using conventional compression molding machinery. The outsole 22 is molded from material having the desired resiliency and wear characteristics, such as a relatively high durometer polyurethane material. The outsole 22 is preferably attached to the midsole part 16 using conventional techniques and apparatus. In the preferred embodiment, the outsole 22 is secured to the lower surface of the midsole part 16 by cement or other adhesives using conventional techniques and apparatus.

The cushioning insert 24 is preferably manufactured using conventional techniques and apparatus, and therefore will not be described in detail. Suffice it to say that the cushioning insert 24 is manufactured from a material such as EVA using conventional techniques and apparatus. The insert 24 is fitted within the insert recess 46 to complete assembly of the sole 12. The cushioning insert 24 can be cemented, frictionally fitted or otherwise secured in place as desired.

The collar 20 is manufactured using a mold (not shown) having a base mold and interchangeable first and second cover molds. The base mold and first cover mold cooperatively define a cavity having the shape of the inner layer 70. The appropriate material is then injected in the mold cavity to form the inner layer of the collar 20 (See FIG. 14). The first cover mold is removed from the base mold once the inner layer 70 is sufficiently cured. While the inner layer 70 remains in place on the base mold, the second cover mold is moved into place on the base mold. The second cover mold cooperates with the outer surface of the inner layer 70 to define a cavity corresponding in shape to the outer layer 72. The appropriate material is then injected into the cavity in a second shot to form the outer layer 72 (See FIG. 15). As the material of the second shot cures, it bonds to the inner layer 70 providing an integral, dual density collar 20 (See FIG. 16). The lacing hook holes 82a–b can be formed as part of the molding process or they can be punch, drilled or otherwise formed in the collar 20 after the molding process is complete.

Once manufacture of the collar 20 is complete, it is attached to the upper 100 with stitching 75 using conventional stitching techniques and apparatus. If desired, stitching holes (not shown) can be preformed in the inner layer 70 prior to stitching, for example, by drilling, punching or as part of the molding process. The lacing hook 83 is secured to collar 20 at holes 82a–b using rivets or other conventional fasteners. The rivets may extend just through the collar 20, typically both inner and outer layers, or may extend through the collar 20 and the upper 100. The collar 20 is also cemented or otherwise attached to the sole 12 using conventional techniques and apparatus.

The combined upper 100 and collar 20 are then attached to the sole 12. Preferably, the upper 100 and collar 20 are direct attached to the sole using conventional techniques and apparatus. In the preferred embodiment, the upper 100 and collar 20 are cemented directly to the upper surface 42 of the midsole part 16 using conventional cement or other adhesives. A sock lining or other conventional insert can be placed within the footwear 100 as desired.

ALTERNATIVE METHOD OF MANUFACTURE FOR MIDSOLE

Figure 10:
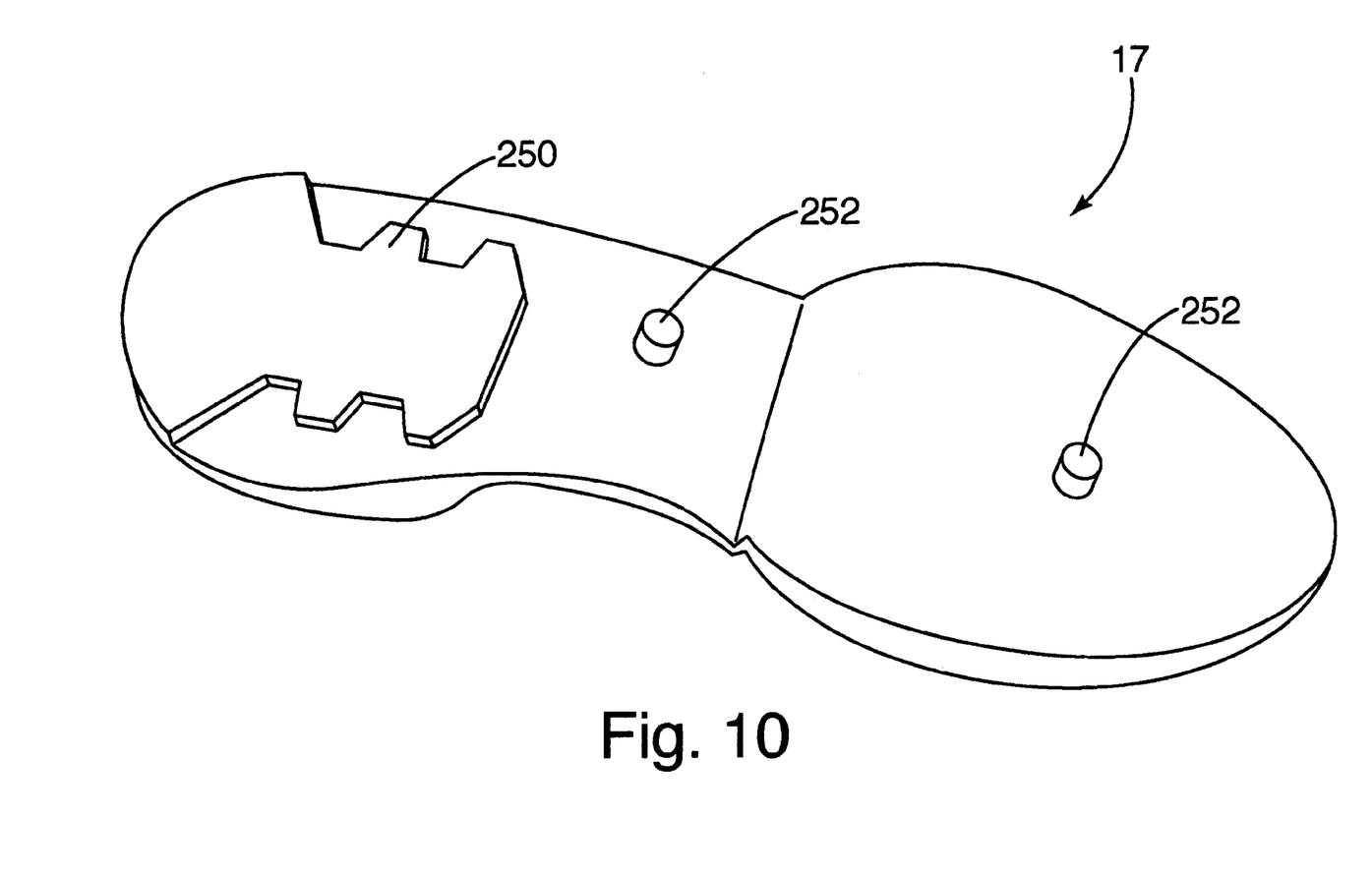
FIG. 10 is a perspective view of a portion of the midsole molded in a first injection according to an alternative embodiment.
Figure 11:
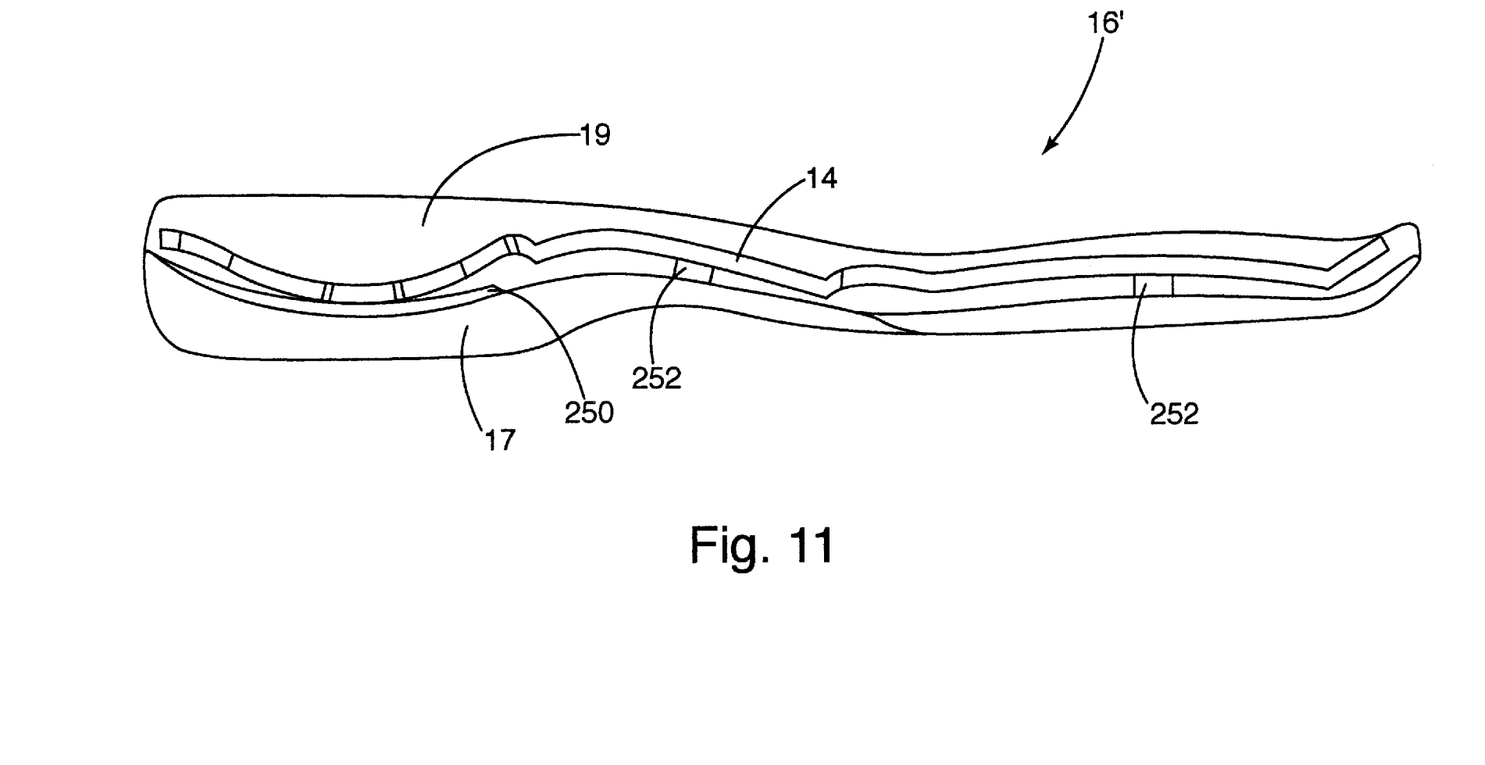
FIG. 11 is a side elevational view of the flexplate disposed above the portion of the midsole molded during the first injection in the alternative embodiment.

In an alternative embodiment, the midsole part 16' is molded in several injections. The first injection forms the lower portion 17 of the midsole part 16' with a platform 250 and integral locating pins 252 for supporting the flexplate 14. The second injection forms the rear stabilizer 18. And, the third injection forms the upper portion 19 of the midsole part 16'. FIG. 10 shows the flexplate 14 disposed above the lower portion 17 with the upper portion 19 illustrated in phantom lines.

Figure 12:
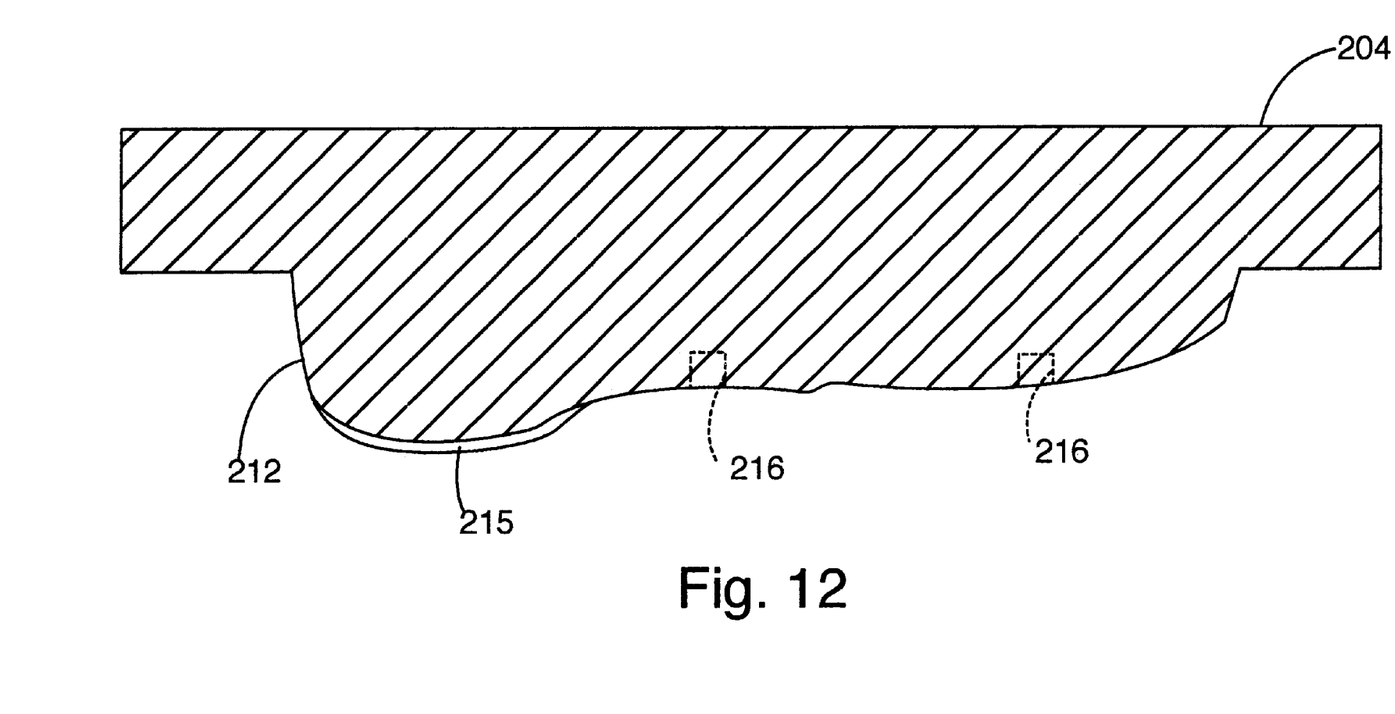
FIG. 12 is a sectional view of the first midsole cover mold for the alternative embodiment.

In this embodiment, the mold includes a base mold (not shown) and three interchangeable cover molds, only the first 204 of which is shown in the drawings. The base mold of this embodiment is generally identical to the base mold 110 of the embodiment discussed above, except that it does not include flexplate locating pins 118. The base mold includes a cavity portion that defines the majority of the midsole part 16' as well as the rear stabilizer 18. The first cover mold 204 includes a male portion 212 that extends into and cooperates with the cavity portion of the base mold to define a cavity 214 in the shape of a lower portion 17 of the midsole part 16'. The first cover mold 204 also defines a platform recess 215 and a pair of locating pin recesses 216. The platform recess 215 and locating pin recesses 216 create support elements in the lower portion 17 of the midsole part 16' that support the flexplate 18 within the mold during molding of the upper portion of the midsole part 16'.

The lower portion 17 of the midsole part 16 is molded by closing the first cover mold 204 onto the base mold (not shown). This defines a cavity in the shape of the lower portion 17 of the midsole part 16'. The midsole part material is then injected into the mold in a conventional manner to fill the cavity, including platform recess 215 and locating pin recesses 216. The material is permitted to cure as desired and then the first cover mold 204 is removed. The platform recess 215 and locating pin recesses 216 have defined a platform 250 and a pair of locating pins 252 to support the flexplate 14 during molding of the remainder of the midsole part 16' (See FIG. 10). The lower portion 17 of the midsole part 16' is left in the base mold during the remaining molding steps as described in more detail below. As with the midsole part 16 of the preferred embodiment, the lower portion 17 of the midsole part 16' is preferably manufactured from a relatively soft polymer, such as Hipren SL3.

The rear stabilizer 18 is molded next using the base mold and the second cover mold. The second cover mold (not shown) is generally conventional and it includes a male portion that extends into and cooperates base mold to define a cavity in the shape of the rear stabilizer 18. The desired material is then injected into the rear stabilizer cavity in a conventional manner, where it is permitted to cure to define the rear stabilizer 18. As with the preferred embodiment described above, the rear stabilizer is preferably manufactured from a relatively rigid and durable material, such as Hipren H2T.

Next, the second cover mold (not shown) is removed to provide access to the lower portion 17 of the mold part 16' and the rear stabilizer 18, both or which are retained on the base mold (not shown) for the upcoming final injection. The flexplate 14, which is preferably pre-molded as in the previously described embodiment, is then placed in the mold atop the lower portion of mold part 16'. The flexplate 14 is supported atop the platform 250 and locating pins 252 defined in the lower portion 17 of the midsole part 16' (See FIG. 11). The first portion of the midsole part 16' and the rear stabilizer 18 are left on the base mold where they remain trapped during the next injection molding step. The third cover mold (not shown) is then closed on the base mold. The third cover mold is not illustrated in the drawings, but it is generally identical to the second cover mold 114, except that it does not include the flexplate locating pins 126. The third cover mold cooperates with the base mold, the first portion 17 of the midsole part 16' and the rear stabilizer 18 to define a cavity in the shape of the remaining, or upper portion 19, of the midsole part 16' yet to be formed. The appropriate material is then injected into the mold cavity in a conventional manner. In the preferred embodiment, the upper portion of the midsole part 16' is manufactured from the same material as the lower portion of the midsole part 16', which in this alternative embodiment is Hipren SL3. Although the two midsole parts 17 and 19 need not be manufactured from the same material, it is desirable for the two midsole parts 17 and 19 to be manufactured from materials of the same family of materials so that they readily bond to one another. As the material from this injection cures, it bonds to the lower portion of the midsole part 16' and the rear stabilizer 18. As a result, the material cures to provide an integral midsole part 16'. Once cured, the mold is opened and the midsole part 16' is removed for incorporation in the boot 10 as described above in connection with the preferred embodiment.

The above description is that of one or more preferred embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method for manufacturing a sole system for footwear, comprising:

providing a mold having first and second mold parts, the first and second mold parts each including flexplate locating pins;

placing a flexplate within at least one of the first and second mold parts, the flexplate being substantially rigid;

closing said first and second mold parts to cooperatively define a first cavity about the flexplate, the flexplate locating pins of the first and second mold parts extending into the first cavity to suspend the flexplate within the first cavity;

injecting material into the first cavity to form a sole part, the sole part substantially surrounding and entrapping the flexplate, the material being selected such that the cured material is substantially softer than the flexplate;

providing the mold with a third mold part;

closing the third mold part onto the first mold part prior to said step of closing said first and second mold parts, the first and third mold parts defining a rear stabilizer cavity in a shape of a rear stabilizer;

injecting a material into the rear stabilizer cavity to form the rear stabilizer, the rear stabilizer material being selected such that the cured material is substantially stiffer than the sole part, thereby providing the sole part with increased support in a heel region of the sole part;

opening the first and third mold parts and retaining the rear stabilizer on the first mold part whereby the sole part is integrally molded to the rear stabilizer when the material is injected into the first cavity to form the sole part; and removing the formed sole and rear stabilizer from the mold.

2. The method of claim 1 wherein the flexplate defines a plurality of openings, the openings permitting the sole part material to flow through and entrap the flexplate during said step of injecting material into the second cavity.

3. The method of claim 2 wherein the flexplate defines a plurality of radially extending slots in a heel region.

4. The method of claim 3 wherein the heel region of the flexplate is cupped.

5. The method of claim 4 further comprising the steps of:

molding an inner layer from a substantially flexible polymeric material selected to permit said inner layer to be stitched to an upper;

molding an outer layer into place about the inner layer to form a one-piece, dual density collar, the outer layer being a substantially rigid polymeric material selected to provide stability to the collar; and attaching the collar to the sole part.

6. The method of claim 5 wherein the inner layer includes a marginal portion extending beyond a periphery of the outer layer, the marginal portion providing a stitching allowance along which the collar can be stitched to an upper.

7. The method of claim 6 wherein the collar includes a lacing attachment means for receiving a lace of a lacing system.

8. The method of claim 7 further comprising disposing an insert adjacent the heel region of the flexplate.

9. The method of claim 8 wherein the insert includes reinforcing fiberglass.

10. The method of claim 9 further comprising the step of attaching an outsole to the sole part, the outsole being manufactured from a relatively durable material.

11. The method of claim 10 wherein the sole part material is a relatively resilient polymer selected to provide cushioning.

* * * * *